Feb. 18, 1941.   W. G. O. STIEBER   2,232,494
CLOSURE, UNION, AND ADAPTER
Filed Jan. 10, 1939
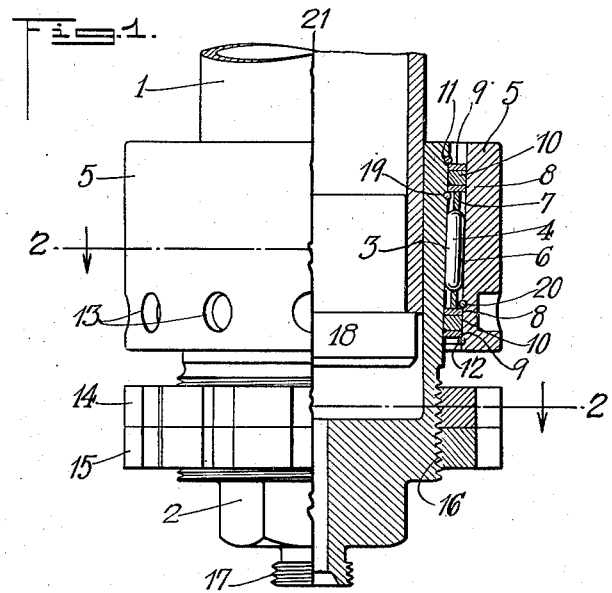
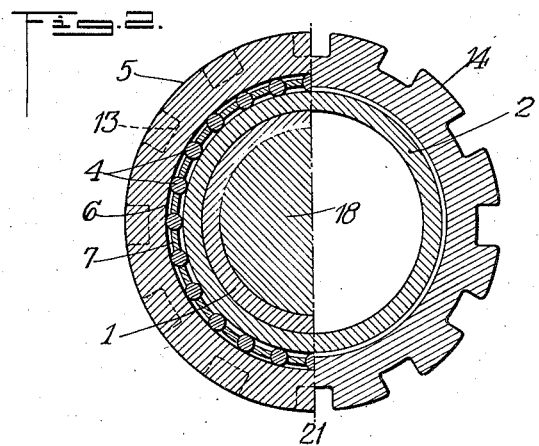
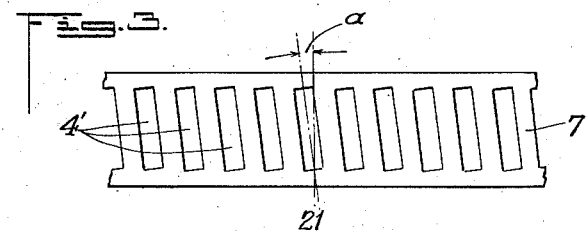
INVENTOR.
WILHELM GUSTAV OTTO STIEBER.
BY Karl A. Mayr
ATTORNEY.

Patented Feb. 18, 1941

2,232,494

UNITED STATES PATENT OFFICE 2,232,494

CLOSURE, UNION, AND ADAPTER

Wilhelm Gustav Otto Stieber, Munich, Germany

Application January 10, 1939, Serial No. 250,146
In Germany June 18, 1935

7 Claims. (Cl. 220—55)

The present invention relates to a method and means for fully or partly closing hollow bodies such as tubes, cylinders, etc. The basic idea underlying the present invention is similar to the one underlying the invention disclosed in my copending application Ser. No. 84,502, filed June 10, 1936, of which the present application is a continuation in part.

An object of the present invention is the provision of a strong and tight closure, union or adapter for closing or interconnecting hollow bodies which can be easily removed and applied.

According to the present invention the closure, union or adapter has a cylindrical part which has a cone shaped exterior configuration; around said cylindrical part an annular member is disposed which has a cone shaped interior which substantially corresponds with the exterior of said cylindrical part and is axially movable with respect thereto. Between both cone shaped surfaces a plurality of roller bodies is disposed which are preferably held and guided by means of a suitable guide means or cage in such position and along such a path that, upon a revolving motion of one cone surface with respect to the other, an axial displacement of said annular member with respect to said cylindrical part is automatically induced. In order to tighten the closure or adapter to the body to be closed or connected with another body, a mere twisting of the annular member is needed; due to the resulting axial movement of the annular member with respect to the closure and the cone configuration of the cooperating parts, the cylindrical part of the closure is compressed and elastically deformed in radial direction and onto the hollow body.

Further and other objects of the present invention will be hereinafter set forth in the accompanying specification and shown in the drawing which, by way of illustration, show what I now consider to be a preferred embodiment of my invention.

In the drawing:

Figure 1 is a part sectional view of a device embodying the present invention.

Figure 2 is a cross-sectional view of the device shown in Fig. 1 whereby the section is made along line 2—2 in Fig. 1.

Figure 3 shows a detail of the device illustrated in Figs. 1 and 2 in straightened out condition.

Like numerals indicate like parts in all figures of the drawing. In the embodiment of my invention shown in the drawing which is just one example of an application of this invention the invention is used for tightly closing the end of a tube 1. A cap or union member 2 is slipped over the tube end, said cap having a cylindrical part with a cone shaped exterior surface 3. An annular member 5 having a cone shaped interior surface 6 is slipped over the surface 3 whereby the conicity of the surfaces 3 and 6 is alike. Rollers 4 are disposed between both surfaces and are held in position by means of a guide or cage member 7. A part of member 7 is shown in straightened out position in Fig. 3. Member 7 has a plurality of longitudinal openings 4' the longitudinal axis of which is inclined with respect to the central axis 21 of the device by an angle $a$. Cage 7 is held in position by means of holding means or rings 8 which prevent axial movement of the cage and rolling members confined therein. Additional rings 9 and a packing material 10 in between pairs of rings 8 and 9 may be provided. Axial movement of the locking or holding rings 8 and 9 and the packing 10 is prevented by the provision of spring rings 11, 12, 19 and 20 which fit into grooves provided in the cone surface of either the cylindrical part of the cap member or the cone surface of the annular member.

Upon rotation of the annular or tightening member 5, due to the twisted position and the action of the rolling members 4, member 5 moves axially with respect to the cylinder part 3 of the cap 2 whereby the rollers 4 are pressed toward part 3 and the latter is elastically deformed and pressed to the tube 1 which is thereby tightly closed. The force required for tightening member 5 is very small. Upon rotation of member 5 cap 2 can be easily removed because the cylindrical part of cap 2 was only elastically and not permanently deformed and widens out as soon as, due to the relative axial movement of the cone surfaces 3 and 6, space is provided.

For applying a suitable spanner recesses 13 are provided in member 5.

The device after it has been tightened up will remain in tightened position. At certain conditions, for example, when the device is subject to vibrations a locking of member 5 in tightened position may be desired. For this purpose lock nuts or rings 14, 15 may be provided which are screwed to the threaded part 16 of cap 2 until they contact member 5.

One or both of the threaded members 14 and 15 may be used for axially displacing the tightening member 5 with respect to the casing or union member 2 and thereby for tightening up the device.

The closing device according to the present invention can be removed as a whole from the body to be closed; separation of parts 2 and 5 and the rollers thereinbetween is prevented by the separation preventing lock rings 11, 12 and 19, 20. This feature of the present invention is particularly desirable because one closure can be used without special assembling and disassembling for several hollow bodies.

The closure 2 may be provided with an extension 17 for connecting another tube or hollow body and be thus used as a union member. The device according to the present invention is then a union or adapter for temporarily or permanently interconnecting tubes or hollow bodies of equal or different diameters whereby the connection is absolutely tight and easily removed and applied.

In tubes or hollow bodies which are subjected to high internal pressures or the walls of which are comparatively thin a plug member 18 may be inserted for reinforcement.

While I believe the above described embodiments of my invention to be preferred embodiments, I wish it to be understood that I do not desire to be limited to the exact details of method, design and construction shown and described, for obvious modifications will occur to a person skilled in the art.

I claim:

1. A closure for a hollow body having a caplike closing member substantially surrounding and capping the part of said body which part is to be closed and having a cone shaped exterior surface, a tightening member having a cone shaped interior surface corresponding to and surrounding and being axially movable and rotatable with respect to said exterior surface, and a plurality of rolling members positioned in between said surfaces, said rolling members being pressed onto said closing member and the latter onto said hollow body upon axial movement of said surfaces with respect to one another.

2. A closure for a hollow body having a caplike closing member substantially surrounding and capping the part of said body which part is to be closed and having a cone shaped exterior surface, a tightening member having a cone shaped interior surface corresponding to and surrounding and being axially movable and rotatable with respect to said exterior surface, a plurality of rolling members positioned in between said surfaces, said rolling members being pressed onto said closing member and the latter onto said hollow body upon axial movement of said surfaces with respect to one another, and rolling member guide means adjacent to said rolling members which guide said rolling members along a screw path and produce an axial movement of said closing member relatively to said tightening member upon rotation of one of said two last mentioned members.

3. A closure for a hollow body having a caplike closing member substantially surrounding and capping the part of said body which part is to be closed and having a cone shaped exterior surface, a tightening member having a cone shaped interior surface corresponding to and surrounding and being axially movable and rotatable with respect to said exterior surface, and a guide means having slot-like openings the longitudinal axis of which is twisted with respect to the central axis of said surfaces, rollers disposed in said openings and in between said surfaces and being guided along a screw path by said guide means and producing an axial movement of said closing member with respect to said tightening member upon rotation of one of said two last mentioned members whereby said rollers are pressed onto said closing member which is temporarily elastically deformed and pressed onto said hollow body.

4. A closure for a hollow body having a closing member surrounding said body and having a cone shaped exterior surface, a tightening member having a cone shaped interior surface corresponding to and surrounding and being axially movable and rotatable with respect to said exterior surface, a plurality of rolling members positioned in between said surfaces, said rolling members being pressed onto said closing member and the latter onto said hollow body upon axial movement of said surfaces with respect to one another, and a lock member connected with one of said two first mentioned members and directly cooperating with the other of said two first mentioned members and preventing relative axial displacement of said surfaces.

5. A closure for a hollow body having a closing member surrounding said body and having a cone shaped exterior surface, a tightening member having a cone shaped interior surface corresponding to and surrounding and being axially movable and rotatable with respect to said exterior surface, a plurality of rolling members positioned in between said surfaces, said rolling members being pressed onto said closing member and the latter onto said hollow body upon axial movement of said surfaces with respect to one another, and holding means and separation preventing means disposed between said closing and said tightening member and enclosing and holding said rolling members in between said surfaces and preventing separation of said closing member and said tightening member.

6. A closure for a hollow body comprising a plug member adapted to be inserted into said hollow body, a closing member substantially surrounding and enclosing said body and plug member and having a cone shaped exterior surface, a tightening member having a cone shaped interior surface corresponding to and surrounding and being axially movable and rotatable with respect to said exterior surface, and a plurality of rolling members positioned in between said surfaces, said rolling members being pressed onto said closing member and the latter onto said hollow body and said hollow body onto said plug member upon axial movement of said surfaces with respect to one another.

7. A union for interconnecting a hollow body and another body, said union comprising a union member to which said other body is connected, said member having a cylindrical part which fits around one of said bodies and which has a cone-shaped exterior surface, a tightening member having a cone-shaped interior surface corresponding to and surrounding and being axially movable and rotatable with respect to said exterior surface, and a plurality of rolling members positioned in between said surfaces, said rolling members being pressed onto said cylindrical part and the latter onto said body which it surrounds upon relative rotation and axial movement of said surface.

WILHELM GUSTAV OTTO STIEBER.